DATA PROCESSING SYSTEM

Filed Feb. 16, 1961

6 Sheets-Sheet 1

Aug. 10, 1965 D. N. MacDONALD ETAL 3,200,380

DATA PROCESSING SYSTEM

Filed Feb. 16, 1961 6 Sheets-Sheet 2

Aug. 10, 1965 D. N. MacDONALD ETAL 3,200,380

DATA PROCESSING SYSTEM

Filed Feb. 16, 1961

6 Sheets-Sheet 3

Aug. 10, 1965 D. N. MacDONALD ETAL 3,200,380

DATA PROCESSING SYSTEM

Filed Feb. 16, 1961

6 Sheets-Sheet 5

3,200,380
DATA PROCESSING SYSTEM

Duncan N. MacDonald, Arcadia, Calif., Edward Glaser, Newton Square, Pa., and Fred W. Bauer and John J. Dowling, Altadena, Douglas T. Kielty, Monrovia, and Paul D. King, Pasadena, Calif., assignors to Burroughs Corporation, Detroit, Mich., a corporation of Michigan Filed Feb. 16, 1961, Ser. No. 89,866
4 Claims. (Cl. 340—172.5)

This invention relates to digital data processing systems and more particularly to a digital data processing system employing a digital data processor for operating under the control of a stored program.

This application is an improvement over the invention disclosed and claimed in the copending application entitled Computer System, bearing the Serial No. 89,525, filed February 15, 1961, in the name of Warren W. Hopper, et al., and assigned to the same assignee as the present invention.

In the past, high speed digital data processors have been employed in data processing systems. However, the over-all system for processing the data has generally been quite slow compared with the high speed digital data processors particularly where a large number of small groups of data are to be processed. This has been due primarily to limitations in speed of the input and output systems. A reason for this limitation in speed is that most systems have one main memory unit for the system, and all communications to the main memory unit from peripheral data handling units in the system are accomplished by interrupting the processing by the digital data processor for the transfer of data into and out of the main memory unit. While the digital data processor is in the interrupt condition, a large block or group of data is shifted into the main memory and stored or shifted out at the main memory, then the processor is released to allow it to continue with its processing.

The cost of previous data processing systems has also been high. One reason is that a single control unit, or data synchronizing unit, has been used to operate and control certain peripheral data handling units. For example, if there is a plurality of peripheral data handling units such as tape transports, punched paper card readers, et cetera, a separate control unit is connected to each unit. A switch circuit is generally connected between the control units and the digital data processor in the system so that the digital data processor and its associated main memory unit can communicate with one of the control units.

To allow the control units to be used more efficiently, a number of main memory units have been added so that simultaneous communication may be carried on between one or more peripheral units and separate main memory units at the same time. However, even with this arrangement, the data processor is interrupted while a large group of data is stored in the main memory units. This arrangement is also slow in that when a control unit is operating one of the peripheral units to which it is connected and data is simultaneously needed from another peripheral unit connected to that same control unit, the latter mentioned peripheral unit must be held up until communication with the first peripheral unit is completed. In order to increase the speed of the input-output system, more control units may be added. However, this greatly increases the cost of the system.

The present invention overcomes the above disadvantages through the provision of a system wherein the digital data proccesor can access a main memory unit even though an input-output channel is presently busy transferring information to a main memory unit. This is accomplished by the use of special time-sharing and priority circuits. When two or more main memory units are added to the data processing system, parallel communications may be made between the main memory units and the peripheral units and the data processor with greatly increased speed and efficiency. The cost of a digital data processing system in accordance with the present invention is greatly reduced by making the most efficient use of control units referred to hereinafter as "input-output channels" and by a system arrangement which minimizes the number of input-output channels needed. Also, the cost of the input-output channels can be greatly reduced from the previous control units in that communication in only one direction need be provided for through an input-output channel at one time, whereas in previous units, simultaneous two-way communication was needed through control units. It will also become evident that the present invention virtually eliminates inefficiency due to component idleness.

Briefly, a digital data processing system which incorporates the present invention comprises a plurality of separate main memory units which will hereinafter be referred to as "memory modules." The memory modules store digital data signals which are to be processed and program signals for directing the processing of the data signals. Two digital data processors are provided for doing the actual data processing. A plurality of peripheral data handling units including tape units, card readers and card punches are provided for storing and entering programs and data signals into the data processing system. Each of these peripheral units is connected to an input-output exchange or a switching circuit. A plurality of input-output channels is also connected to the input-output exchange and comprise timing, storage and control circuits for operating any one of the peripheral units and for controlling the transfer of digital data signals to and from each of the peripheral units. The cross switching circuit has the ability to connect any one of the input-output channels to any one of the peripheral units. In addition, the cross switching circuit may simultaneously connect one or more of the input-output channels to peripheral units. A switch interlock circuit is also provided for connecting any one or more of the memory modules to one or more of the digital data processors and to one or more of the input-output channels. Such an arrangement allows any input-output channel to be associated with any peripheral unit. Due to the modularity of the system and the independent operation of the input-output channels whenever there is an increase in system capacity requirements, additional capacity is immediately available by the addition of more input-output channels without the need of reprogramming. This system arrangement frees the program for the digital data processors of sequencing and controlling the input-output system. This system arrangement also provides the digital data processor with more time in which to perform its actual processing functions in that the digital data processor only needs to momentarily interrupt and initiate an input-output operation after which it may immediately return to other control functions or processing as the program may direct. By the use of the input-output exchange, the system maximizes the use of all input-output channels and provides a system balance between the transfer of information to and from the peripheral units.

A better understanding of the present invention may be obtained with reference to the following detailed description and the accompanying figures of which:

Figures 1, 2, 3:
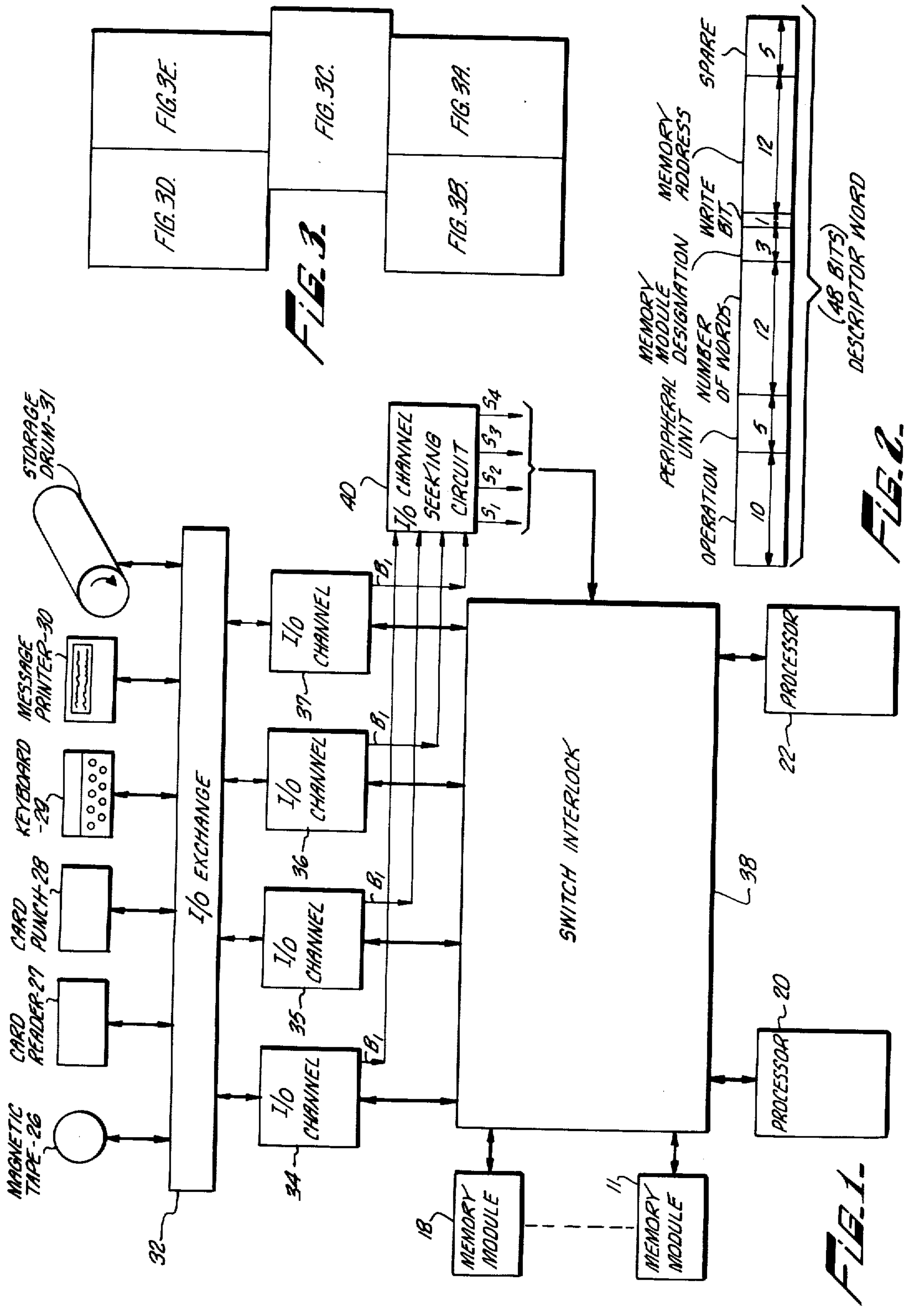
FIG. 1 is a general block diagram showing a data processing system embodying the present invention.
FIG. 2 is a diagram showing the word structure of a descriptor word for use by the input-output channels of the data processing system of FIG. 1.

FIGS. 3A through 3E form a detailed schematic diagram of the data processing system shown in FIG. 1; and, FIG. 3 shows the arrangement of FIGS. 3A through 3E.

Refer now to the general block diagram of the digital data processing system embodying the invention shown in FIG. 1. Eight memory modules 11 through 18 are provided for storing digital data signals, to be processed, and program signals for specifying the sequence of operation during the processing of the data signals. Two digital data processors 20 and 22 are provided for performing the actual processing of the data signals. Peripheral data handling units are provided for intermediate and permanent storage of data requests and for introducing new data signals and program signals into the data processing system of FIG. 1. The peripheral data handling units shown in FIG. 1 include a magnetic tape transport unit 26, a punched paper card reader 27, a paper card punching unit 28, a keyboard unit 29, an electromechanical message printing unit 30 and a rotating magnetic coated storage drum 31. The magnetic tape transport unit 26 and the storage drum 31 are provided for intermediate storage of data signals and the program signals which will subsequently be shifted into the memory modules 11 through 18 for use by the digital data processors 20 and 22 during processing.

All information is read from and written on the magnetic tape of the magnetic tape transport 26 and on the magnetic storage drum 31 a character of signals at a time in a conventional manner. To be explained, a character of signals is composed of six binary coded bits of information.

The punched paper card reader 28 and the keyboard unit 29 are for introducing new signals into the digital data processing system of FIG. 1, the transfer of signals also being a character of signals at a time. The punched paper card reader 28 is a standard unit used for reading punched paper cards and the keyboard unit 29 may be any one of a number of well known normally operated devices for allowing an operator to introduce digital signals into the data processing system of FIG. 1. The message printer 30 is a printing unit for mechanically printing out symbols for visual observation by an operator.

The peripheral data handling units 26 through 31 are connected to a cross bar type switching circuit or input-output exchange unit 32, which will subsequently be referred to as the I/O exchange 32. The I/O exchange 32 is also connected to four input-output channels 34 through 37 inclusive, which subsequently will be referred to as the I/O channels 34 through 37.

The I/O exchange 32 may be a standard type of switching circuit such as that used in telephone exchanges in which any one of the I/O channels 34 through 37 may be cross connected to any one of peripheral data handling units 26 through 31. In addition, the I/O exchange 32 has the ability to simultaneously connect one or more of the I/O channels 34 through 37 to separate peripheral units. A switching interlock circuit 38 is connected to the processors 20 and 22, each of the memory modules 11 through 18 and each of the I/O channels 34 through 37. The purpose of the switch interlocks is to couple the memory modules 11 through 18 to either the I/O channels or the processors.

Each of the I/O channels 34 through 37 has a separate output circuit, designated by the symbol $B_1$ which indicates whether that particular I/O channel is presently transferring information between a peripheral unit and one of the memory modules. When an I/O channel is transferring information, it will hereinafter be referred to as the "busy state" of an I/O channel. An I/O channel seeking circuit 40 is connected to the $B_1$ output circuits of each of the I/O channels 34 through 37 and has four separate output circuits, designated by the symbols S1 through S4 inclusive, which in turn are connected to the switch interlock 38. The I/O channel seeking circuit 40 is responsive to the signals at the output circuits $B_1$ of the I/O channels 34 through 37 to develop a high potential output signal at one of the output circuits S1 through S4 corresponding to the lowest numbered I/O channel 34 through 37 respectively, which is not busy. For example, when none of the I/O channels are busy, an output signal will be developed at the output circuit S1; when only the I/O channel 34 is busy, a high potential output signal will be developed at the output circuit S2, et cetera.

The digital data processing system of FIG. 1 is operated under the control of two programs. One program is referred to as a Master Control Program and the other is the Operational Program. The Master Control Program controls the operation of the data processing system for such functions as compiling, controlling the transfer of information between peripheral units and the memory modules and special interrupt routines. Compiling is the operation of the data processing system when a new program is translated from the operator's language into machine language so that it may be properly interpreted by the processors. The Operational Program is the program which is translated from the operator's language into machine language by the compiler operation. The Operational Program directs the special processing functions of the digital data processors 20 and 22 such as adding, subtracting, et cetera. The operation of the digital data processors 20 and 22 during the special processing functions as well as other details are disclosed in a co-pending patent application by Paul D. King and Robert S. Barton entitled Digital Computer, assigned to the same assignee as this patent application, and bearing the Serial No. 84,156 and filed on January 23, 1961.

The present patent application is primarily directed to the operation of the digital data processing system of FIG. 1 when under the control of the Master Control Program and, more particularly, when there is a transfer of information between the memory modules and the peripheral units and other processors.

Consider now the general operation of the digital data processing system of FIG. 1 when the Master Control Program specifies that communication is to be made between one of the memory modules 11 through 18 and one of the digital data processors 20 and 22. The Master Control Program is transferred from the memory modules 11 through 18 through the switch interlock 38 to the digital data processors 20 and 22 as needed. Assume a word of the Master Control Program is stored in the processor 20 specifying that information is to be read from a memory module 11 and transferred to processor 20. The processor 20 then makes a request for access to the memory module 11. It will be seen in the following discussion that one or more of the I/O channels 34 through 37 could also be making a request for access to the same memory module simultaneously with the request for access by the processor 20. Each memory module has a priority circuit (not shown in FIG. 1) which assigns priority to requests for access by the I/O channels and processors. Assuming that processor 20 is given priority for access to memory module 11, the processor 20 then sends an address signal to the memory module 11. Each of the memory modules has a magnetic core memory unit (not shown in FIG. 1) where information is stored. The address signal specifies the address where information is stored which is to be transferred to the processor 20. Memory module 11 now reads the information out of the memory location specified by the address signal and transfers the information back through the switch interlock 38 into the processor 20. At this point, the memory module is released and starts accepting requests for access again.

Assume now that a word of the Master Control Program is contained in the processor 20 which specifies that information is to be transferred by the memory module 11 to one of the peripheral units 26 through 31. The processor 20 again requests access to the memory module 11. When memory module 11 is free and access is obtained by the processor 20, it again shifts out an address signal through the switch interlock 38. This time the memory location specified by the address is storing a descriptor word.

A descriptor word is composed of forty-eight binary coded bits of information. FIG. 2 shows the word structure of a descriptor word and as indicated, five bits designate a peripheral unit, ten bits designate the operation to be performed on the peripheral unit to be communicated with, twelve bits designate the number of words to be transferred, three bits designate the memory module between which the transfer is to take place, one bit designates whether the information is to be read or written in the designated memory module, and twelve bits designate the beginning address in the memory module between which the information is to be transferred. The descriptor word also has five spare bits.

When the descriptor word is read out of the memory module 11, the processor 20 provides a signal to the switch interlock 38 which indicates that the descriptor word is to be transferred to an available I/O channel. The I/O channel seeking circuit 40 signals the switch interlock indicating the lowest numbered I/O channel 34 through 37 which is not busy. The switch interlock 38 then couples the descriptor word to that I/O channel where it is stored. At this point, the processor 20 and the memory module 11 are released and are free to carry on their operations as though an input-output transfer were not taking place.

Assume that the I/O channel 34 is the one which is now storing the descriptor word. If the descriptor word indicates that the information is to be read from one of the peripheral units, a signal is sent to the I/O exchange 32 which sets up a connection between I/O channel 34 and the unit designated by the unit's portion of the descriptor word (see FIG. 2). Assuming that the unit designated is the magnetic tape unit 26, the I/O channel 34 then sets the magnetic tape unit in operation and reads information from tape a character at a time. When a word of information is accumulated in the I/O channel 34, the I/O channel 34 then requests access to the memory module designated by the descriptor word. Assuming that the memory module 11 is the one requested access to, it assigns priority to the various units requesting access. When I/O channel 34 is given priority access, the word of information stored in the I/O channel, which was read from the magnetic tape unit 26, is transferred through the switch interlock 38 and stored in the memory module 11. At this point, memory module 11 is again released for communication with other units in the system. Another word is then read from the tape unit 26, a character at a time, and the request for access and actual transfer operation is repeated until the number of words of information from tape specified in the descriptor word are stored in the memory module 11. The I/O channel then stops the operation at the tape unit 26 and it also is released for other information transfers.

Figure 3A:
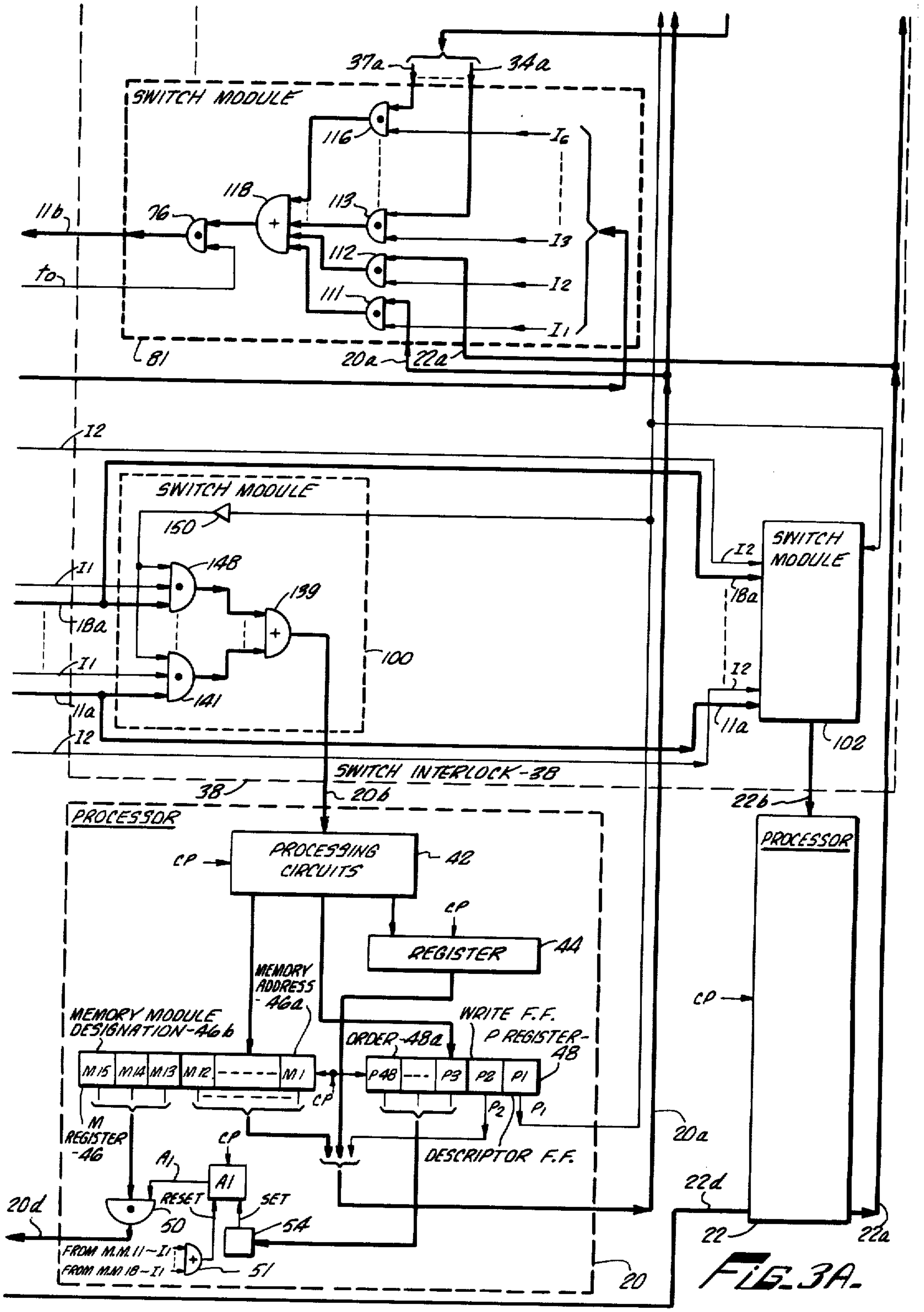
Figure 3B:
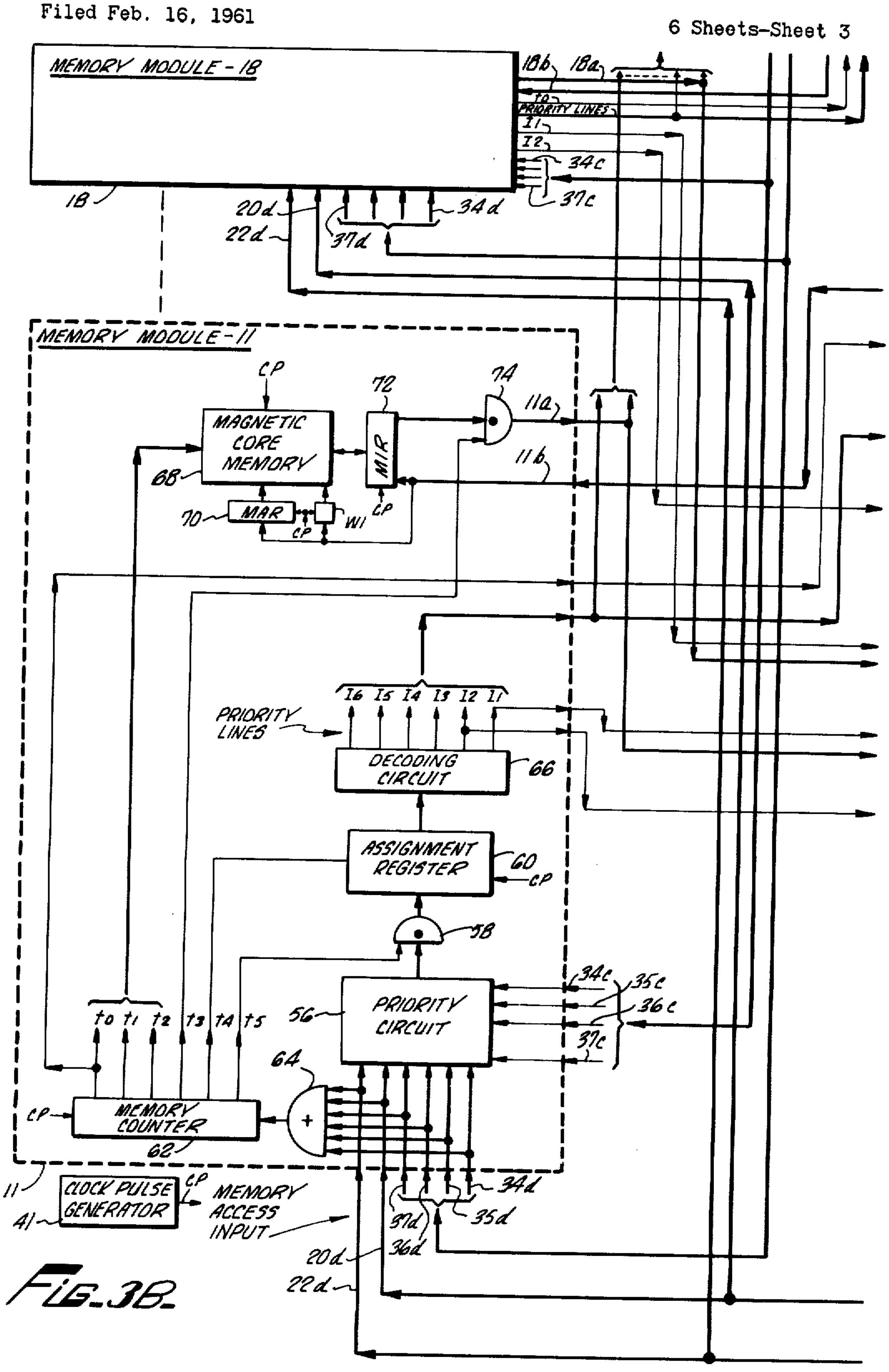

With the general block diagram of FIG. 1 in mind, detailed description will now be given of the circuits of the data processing system as shown in FIGS. 3A, 3B, 3C, 3D and 3E. Refer first to FIG. 3B. A clock pulse generator is shown there which is a source of evenly spaced in time rectangular, reoccurring pulses. These pulses are called clock pulses and, unless otherwise specified, all circuits of the digital data processing system are synchronized to these clock pulses. Thus it will be noted that all of the register circuits, counting circuits and flip-flop circuits are coupled to the output of the clock pulse generator 41, designated by the symbol C.P., except certain circuits in the I/O channels which will be pointed out in a later discussion. All registers (except for those to be pointed out) will be understood to store signals and all flip-flop circuits and counting circuits (except those to be pointed out) will be understood to change state only at the occurrence of the clock pulse signals.

The following conventions in terminology and notation are to be followed in the drawings and the following description. A flip-flop will be designated by a capital letter followed by a number. Only one of the two outputs of the flip-flops are referred to and will be designated by the letter of the flip-flop followed by the number of the flip-flop as a subscript. The flip-flops will be referred to as having two states, a true and a false state. When a flip-flop is in a true state, a high potential signal is developed at the indicated output of the flip-flop circuit.

It will also be noted in the drawings that there are wide connecting lines and narrow connecting lines. The wide connecting lines indicate a number of conductors or a cable of conductors, whereas a narrow connecting line indicates a single conductor.

Figure 3C:
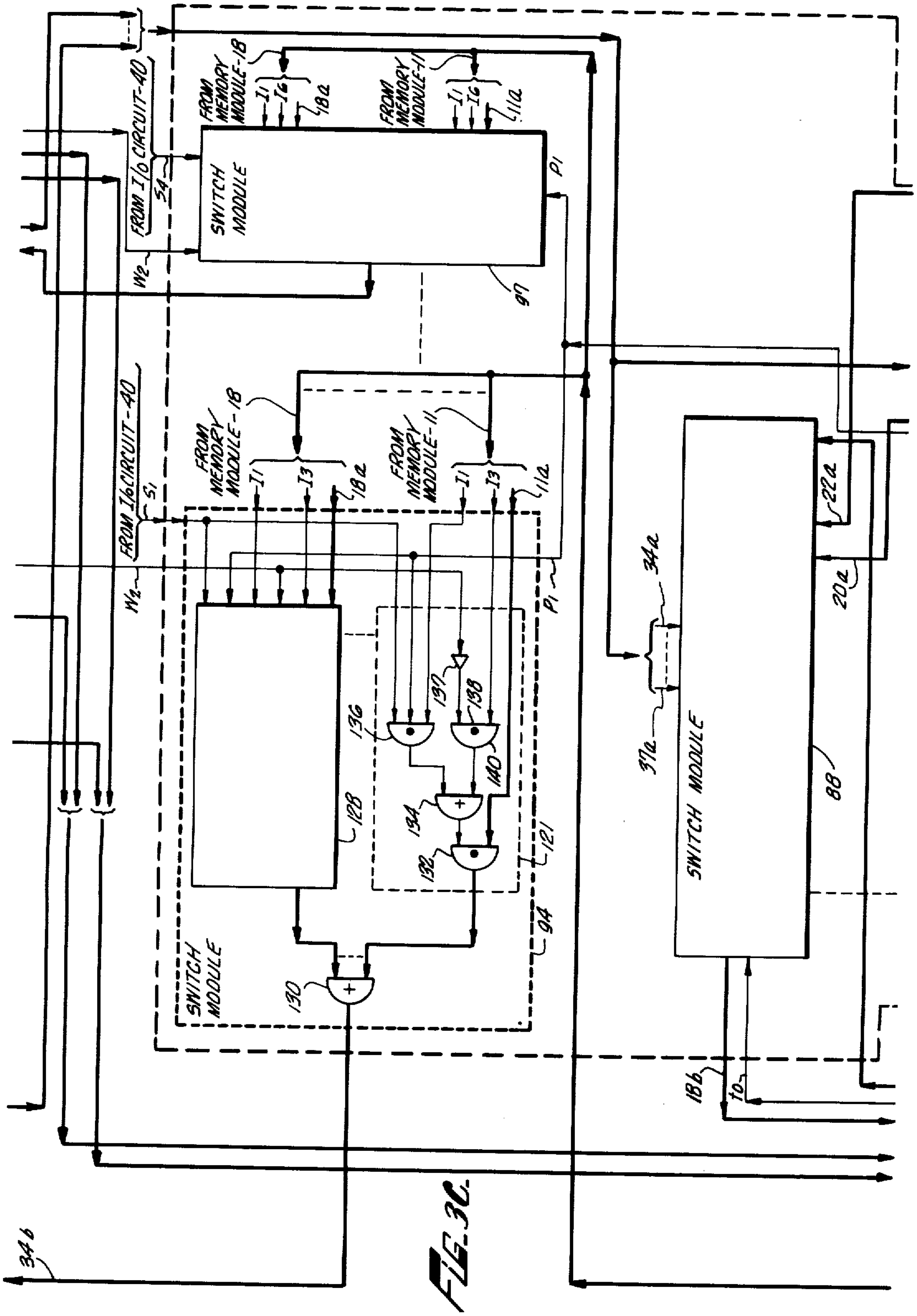

There are two types each of "and" and "or" gating circuits in the drawings referred to in the following description. The "and" gating circuits such as "and" gating circuit 136 shown in FIG 3C is a conventional type of "and" gating circuit and has a plurality of input control lines or conductors and a single output conductor. This type of "and" gating circuit is distinguished by a light line at its output circuit as opposed to a heavy line. The "and" gating circuit 136 provides a high potential output signal at its single output conductor in response to the coincidence of a high potential signal or all of its input conductors.

The "and" gating circuit 132 of FIG. 3C is the other type of "and" gating circuit. This type "and" gating circuit has an input cable connected to its input circuit as well as an output cable connected to its output circuit. This type "and" gating circuit also has one or more control lines connected to its input circuit as well as the input cable. Whenever a high potential signal is simultaneously developed on each of the input control conductors, this 132 type "and" gating circuit couples each of the conductors in the input cable to conductors in the output cable. The 132 type "and" gating circuit is composed of the same number of "and" gating circuits of the type 136 as there are conductors in the input cable. The input circuits of each of the type 136 "and" gating circuits, composing the type 132 "and" gating circuits, are connected to all of the control conductors and each is connected to a different one of the conductors in the input cable. The output circuits of all the type 136 "and" gating circuits are then joined together to form the output cable.

One type of "or" gating circuit is the conventional type such as 134 shown in FIG. 3C. This type has a plurality of control conductors connected to its input circuit and a single conductor connected to its output circuit. A high potential signal on any one or more of the input control conductors causes a high potential signal on its output conductor.

The other type "or" gating circuit is the type 130 of FIG. 3C. This type is distinguished by a plurality of input cables and a single output cable. Each of the input cables has the same number of conductors as the output cable. This type of "or" gating circuit is composed of the same number of type 134 "or" gating circuits as there are conductors in the output cable. One conductor in each of the input cables is connected to the input circuit of one of the type 134 "or" gating circuits. The output circuit of each of the type 134 "or" gating circuits are connected to a single conductor in the output cable.

Refer now to processor 20 whose circuit details are shown in FIG. 3A. The processor 20 includes processing circuits 42 which receive all input signals from the memory modules 11 through 18. Processing circuits 42 are connected to a storage register 44, an M register 46 and a P register 48. The M register 46 has 15 flip-flop circuits designated M1 through M15. The flip-flop circuits M1 through M12 form the memory address section 46a and flip-flop circuits M13, M14 and M15 form the memory module designated section 46b of the M register 46. The output circuits of the memory module designated section 46b is coupled through an "and" gating circuit 50 to a cable designated by the symbol 20d. The input circuit of the "and" gating circuit 50 is also connected to the output circuit $A_1$ of a memory access flip-flop A1. The "and" gating circuit 50 couples all the outputs of the memory module designation section 46b to the cable 20b whenever the memory access flip-flop A1 is in a true state. The P register 48 has forty-eight flip-flop circuits designated P1 through P48. The flip-flop circuits P1 and P2 are referred to as the I/O descriptor and the write flip-flops respectively. The flip-flops P3 through P48 are referred to as the order storage section 48a. The output circuits of the storage register 44, the memory address section 46a, the order section 48a and the output circuit of the write flip-flop P2 are separately coupled to an input circuit of the switch interlock 38 by means of an output cable referred to generally by the symbol 20a. The order portion 48a is coupled to the input circuit of a gating circuit 54. The gating circuit 54 provides trigger signals to the input circuit of the memory access flip-flop A1 for triggering it to a true state. The reset input circuit of the memory access flip-flop A1 for resetting it to a pulse state is connected to an "or" type gating circuit 51. The "or" gating circuit 51 has eight input circuits coupled to output circuits designated by the symbol I1 of the memory modules 11 through 18. To be explained in the description of operation, the memory module designation section 46b, the memory access flip-flop A1, the gating circuits 50, 51 and 54, and the order section 46a form a means for requesting access to the memory modules 11 through 18.

Processor 22 is identical to processor 20 except that the I/O descriptor flip-flop P1 is absent and the "and" gating circuit 51 is connected to output circuits designated by the symbol I2 of the memory modules 11 through 18. To be explained, the I/O descriptor flip-flop P1 is not needed in processor 22 because only processor 20 initiates an input-output operation to a peripheral unit.

With the circuits of processor 20 in mind, refer now to FIG. 3B which shows a diagram of the memory modules 11 through 18. Referring to the detailed circuit diagram of memory module 11, a priority circuit 56 is provided having input circuits connected to output circuits of the I/O channels 34 through 37 and both the 20d and 22d output circuits of the processors 20 and 22. The priority circuit 56 is connected to output cables referred to by the general symbol 34d through 37d of the I/O channels 34 through 37. The priority circuit 56 receives requests for access in the cables 20d, 22d and 34d through 37d and on the basis of a prearranged priority system, arranged of gating circuits, priority is assigned to these units. The priority circuit 56 is arranged to give priority to processor 20 over processor 22. Also, priority is given to any one of the I/O channels requesting access to a memory module over either of the processors 20 or 22. The priority for the I/O channels 34 through 37 requesting access is assigned on the basis of the type of peripheral unit with which the I/O channel is to communicate. Priority is assigned to the peripheral units on the basis of speed of operation. The speeds of transferring signals by the peripheral units, increasing from the fastest to the slowest are as follows: storage drum 31, magnetic unit 26, card reader 27, card puncher 28, message printer 30, and keyboard 29. Thus priority is given to the storage drum 31 over all other peripheral units; priority is given the magnetic tape unit 26 if the storage drum 31 does not need access, et cetera.

The output circuit of the priority circuit 56 is coupled through an "and" gating circuit 58 to the input circuit of an assignment register 60. A memory counter 62 is provided for sequencing the operation of the memory module 11. The memory counter 62 has six states of operation and corresponding to the six states of operation develops output signals at the output lines designated by the symbols $t_0$ through $t_5$. The counting input circuit of the memory counter 62 is connected to the output circuit of an "or" gating circuit 64. The input circuits of the "or" gating circuit 64 are connected to all of the conductors in each of the cables 20d, 22d, and 34d through 37d. Whenever a request for access to a memory module is made to the priority circuit 56, a signal is developed on a conductor in one of these cables and a signal is provided to the memory counter 62. Normally, the memory counter 62 remains in state five. The signal from the "or" gating circuit 64 causes the memory counter 62 to count from state five to state zero then during the following five clock pulses the memory counter steps through the states one, two, three, four and back to state five where it waits for another request for access and a signal from the "or" gating circuit 64.

The $t_5$ output circuit of the memory circuit 62 is connected to another input circuit of the "and" gating circuit 58. Whenever a high potential signal is developed at the output circuit $t_5$, the "and" gating circuit 58 couples the priority circuit 56 to the input of the assignment register 60 causing signals to be stored in the assignment register 60 representing the unit requesting access to the memory module 11 which is given priority. The $t_4$ output circuit of the memory counter 62 is conected to an input circuit of the assignment register 60. Whenever a high potential is developed at the $t_4$ output circuit, the assignment register 60 is cleared. The output circuit of the assignment register 60 is connected to the input circuit of a decoding circuit 66. The decoding circuit 66 has six priority output lines designated by the symbols I1 through I6. The output lines I1 through I6 correspond to the processor 20, the processor 22, and the I/O channels 34 through 37 respectively. Whenever the priority circuit 56 assigns priority to the processor 20 and stores signals corresponding thereto in the assignment register 60, a high potential output signal is developed at the priority line I1 designating that processor 20 now has access to the memory module 11. Similarly, whenever the priority circuit 56 assigns priority to the I/O channel 34 and the corresponding s ignals have been stred in the assignment register 60, a high potential output signal will be developed on the priority line I3, designating that now the I/O channel 34 has access to memory module 11.

A coincident current magnetic core memory unit 68 is provided in the memory module 11 for storing binary coded digital signals of information. The magnetic core memory unit 68 has a plurality of memory locations, each memory location containing storage for forty-eight digital signal bits of information. Each of the memory locations are individually addressable by means of a memory address register 70. The memory address register 70 has twelve flip-flop circuits (not shown) for storing addresses, which are used by the memory address register 70 for addressing the memory locations in the magnetic core memory unit 68.

A memory information register 72 is also provided for storing all words of information read out of the magnetic core memory unit 68 and all words of information to be written into the magnetic core memory unit 68. The memory information register 72 has forty-eight flip-flop circuits (not shown) for storing a single word of information. A write flip-flop W1 is also connected to the magnetic core memory unit 68. Whenever the write flip-flop W1 is in a true state, it indicates that the memory information register 72 contains a new word of information which is to be stored in the memory location of the magnetic core memory unit 68 specified by an address stored in the memory address register 70. Whenever the write flip-flop W1 is in a false state, it signals the magnetic core memory unit 68 to read out a word of information stored in the memory location addressed by the memory address register 70. The memory counter 62 has its output circuits $t_0$, $t_1$, and $t_2$ coupled to the input circuit of the magnetic core memory unit 68 for sequencing the operation of the magnetic core memory unit 68 during the read and write cycles. Addressable core memories of this type are well known in the computer art. See, for example, Chapter 8 of the book entitled Digital Computer Components and Circuits, by R. K. Richards, 1958 edition, published by D. Van Nostrand Company, Inc.

The memory information register 72 has an output circuit coupled through an "and" gating circuit 74 to the information output cable 11*a*. Another input circuit of the "and" gating circuit 74 is connected to the output circuit $t_3$ of the memory counter 62. Whenever the memory counter 62 is in state three, the "and" gating circuit 74 couples the outputs of the memory information register 72 to the information output cable 11*a*. The memory information register 72, the memory address register 70, and the write flip-flop W1 all have their input circuits connected to an input information cable 11*b*, which is connected to the output of the switch interlock 38. To be explained in the following discussion, all signals to be stored in the memory address register 70, the memory information register 72, and the write flip flop W1 are received from the information input cable 11*b*.

Although only the details of memory module 11 have been shown and described, it should be understood that memory modules 12 through 18 are similar to the memory module 11. The only differences are that the priority circuit 56 is arranged for recognizing a request for access only to the memory module in which it is located. For example, the priority circuits 56 in the memory module 11 only recognizes a request for access to memory module 11. Similarly, the priority circuit 56 in the memory module 18 only recognizes a request for access to memory module 18.

With the details of the memory modules 11 through 18 in mind, the schematic diagram of the switch interlock circuit 38 will now be described. Referring now to FIG. 3A and FIG. 3C, the switch interlock 38 has fourteen separate switch modules. Eight switch modules, 81 through 88 inclusive, are provided for coupling output cables designated 34*a* through 37*a* of the I/O channels 34 through 37 and the output cables 20*a* and 22*a* of the processors 20 and 22 to the information input cables 11*b* through 18*b* of the memory modules 11 through 18, respectively. Switch modules 94 through 97 inclusive are provided for coupling the information output cables 11*a* through 11*b* of the memory modules 11 through 18 to the input cables designated 34*b* through 37*b* of the I/O channels 34 through 37, respectively. Switch modules 100 and 102 are provided for coupling the information output cables 11*a* through 18*a* of the memory modules 11 through 18 to the input circuits of the processors 20 and 22, respectively.

Refer now to the circuit details of the switch module 81. The output cables 20*a* and 22*b* from the processors 20 and 22 are connected through "and" gating circuits 111 and 112, respectively, to an "or" gate 118. The cables 34*a* through 37*a* from the output circuits of the I/O channels 34 through 37 are also coupled through "and" gating circuits 113 through 116, respectively, to the "or" gating circuit 118. The "and" gating circuits 111 through 116 also have input circuits coupled to the priority lines I1 through I6, respectively, of the memory module 11. The "or" gating circuit 118 has a plurality of output lines coupled to the outputs of the "and" gates 111 through 112 in parallel. The output lines of the "or" gate 118 are connected through the "and" gating circuit 76 to the information input cable 11*b* of the memory module 11. The "and" gating circuit 76 also has another input circuit connected to the output circuit $t_0$ of the memory counter 62 of the memory module 11. Whenever signals are developed on the lines in the cable 20*a* and priority is assigned to processor 20 by a priority signal on the priority line I1, the signals in the output cable 20*a* will be gated through the "and" gating circuit 111 to the output circuit of the "or" gating circuit 118. Then when the memory counter 62 goes into state two, the $t_0$ output circuit thereof will cause the "and" gating circuit 76 to couple the output circuits of the "or" gating circuit 118 to the information input cable 11*b*. The manner in which the signals in the cables 20*b* and 34*a* through 37*a* are gated to the output circuit of the "and" gating circuit 76 is similar to that for the cable 20*a* except that priority is required by a signal on one of the priority lines I2 through I6, respectively, rather than priority line I1.

Although only switch module 81 has been shown and described in detail, it should be understood that switch modules 82 through 88 are similar to the switch module 81, except that the switch modules 82 through 88 have their output circuits connected to cables 12*b* through 18*b* of the memory modules 12 through 18, respectively, rather than the cable 11*b*. Also, the priority lines are connected to the priority line out of the memory modules 12 through 18 rather than out of the memory module 11.

Having switch modules 81 through 88 in mind, the switch module 94 will now be described. The information output cables 11*a* through 18*a* of the memory modules 11 through 18 are coupled to the input circuits of switching circuits 121 through 128, respectively. The switching circuits 121 through 128 selectively couple the cables 11*a* through 18*a* to the input circuits of an "or" gating circuit 130. The "or" gate 130 in turn couples the outputs of the switching circuits 121 through 128 in parallel to the cable 34*b* to the I/O channel 34. Refer now to the specific circuit details of the switching circuit 12. The cable 11*a* is coupled through the "and" gating circuit 132 to the "or" gating circuit 130. The "and" gating circuit 132 has another input circuit connected to the output circuit of an "or" gating circuit 134. The "or" gating circuit 134 has a single output circuit and two input circuits. One input circuit of the "or" gating circuit 134 is connected to the output circuit of an "and" gating circuit 136 and the other input circuit is connected to the output circuit of an "and" gating circuit 138. The "and" gating circuit 136 has three input circuits. One of the input circuits of the "and" gating circuit 136 is connected to the S1 output circuit of the I/O channel seeking circuit 40. The other two input circuits of the "and" gating circuit 136 are connected to the $P_1$ output circuit of the I/O descriptor flip-flop P1 in the processor 20, and the priority line I1 of the memory module 11. The "and" gating circuit 138 has two input circuits. One of the input circuits of the "and" gating circuit 138 is connected to the priority line I3 out of the memory module 11 and the other input circuit is connected to the output circuit of a signal inverter circuit 137. The signal inverter circuit 137 has its input circuit connected to the output line $W_2$ of the I/O channel 34. To be explained in the description of the I/O channel 34, the $W_2$ output line is the output of a write flip-flop W2 which indicates when information is to be written into a memory module as distinguished from reading information out. The conductors in the cable 11*a* will be coupled to the cable 34*b* whenever a high potential signal is developed on the S1 output line of the I/O channel seeking circuit 40 and on the $P_1$ output line of the I/O descriptor flip-flop P1 simultaneously with a signal on the priority line I1 from the memory module 11. Also, signals in the cable 11*a* will be coupled to the cable 34*b* whenever a low potential signal is developed on the write line $W_2$ out of the I/O channel 34 simultaneously with a high potential signal on the priority line I3.

The switching circuits 122 through 128 are similar to the switching circuit 121 except that the information output cables 12*a* through 18*a* are connected thereto rather than the information output cable 11*a*, and also the priority lines I1 and I3 from the memory modules 12 through 18 are connected thereto rather than the priority lines from the memory modules 111.

The switch modules 95 through 97 are similar to the switch module 94 except that the output cables are connected to the cables 35*b* through 37*b* of the I/O channels 35 through 37, respectively, rather than the cable 34*b*. Another distinction is that the priority lines I4 through I6 from the memory modules 12 through 18 are connected to the switch modules 95 through 97 rather than the priority line I3 of the memory module 11.

Refer now to switch module 100. The switch module 100 has an "or" gating circuit 139 whose output circuit is connected to the cable 20*b*, which is connected to the input circuit of the processing circuits 42 of the processor 20. The "or" gating circuit 139 has eight input circuits which are connected through "and" gating circuits 141 through 148 to output cables 11*a* through 18*a*. The "and" gating circuit 141 has two other input circuits, one of which is connected to the priority line I1 out of the memory module 11, and the other is connected to the output circuit of a signal inverter circuit 150. The inverter circuit 150 has a single input circuit connected to the output circuit $P_1$ of the I/O descriptor flip-flop P1 located in the processor 20. The "and" gating circuits 142 through 148 are similar to the "and" gating circuits 141 except that they have input circuits connected to the priority line I1 of the memory modules 12 through 18, respectively, rather than the priority line I1 of the memory module 11. Thus, whenever a priority signal is developed on the priority line I1 out of memory module 11 and the I/O descriptor flip-flop P1 is false, the "and" gating circuit 141 will couple the output cable 11*a* to the cable 20*b* connecting the processing circuits 42. The operation is similar for the "and" gating circuits 142 through 148.

Switch module 102 is similar to switch module 100 except that the priority lines I2 of the memory modules 11 through 18 are connected to the "and" gates 141 through 148, located therein, rather than the priority lines I1. Another distinction is that the output circuit of the "or" gating circuit 139 is connected to the input cable 22*b* to the processor 22 rather than the cable 20*b* of processor 20.

Figure 3D:
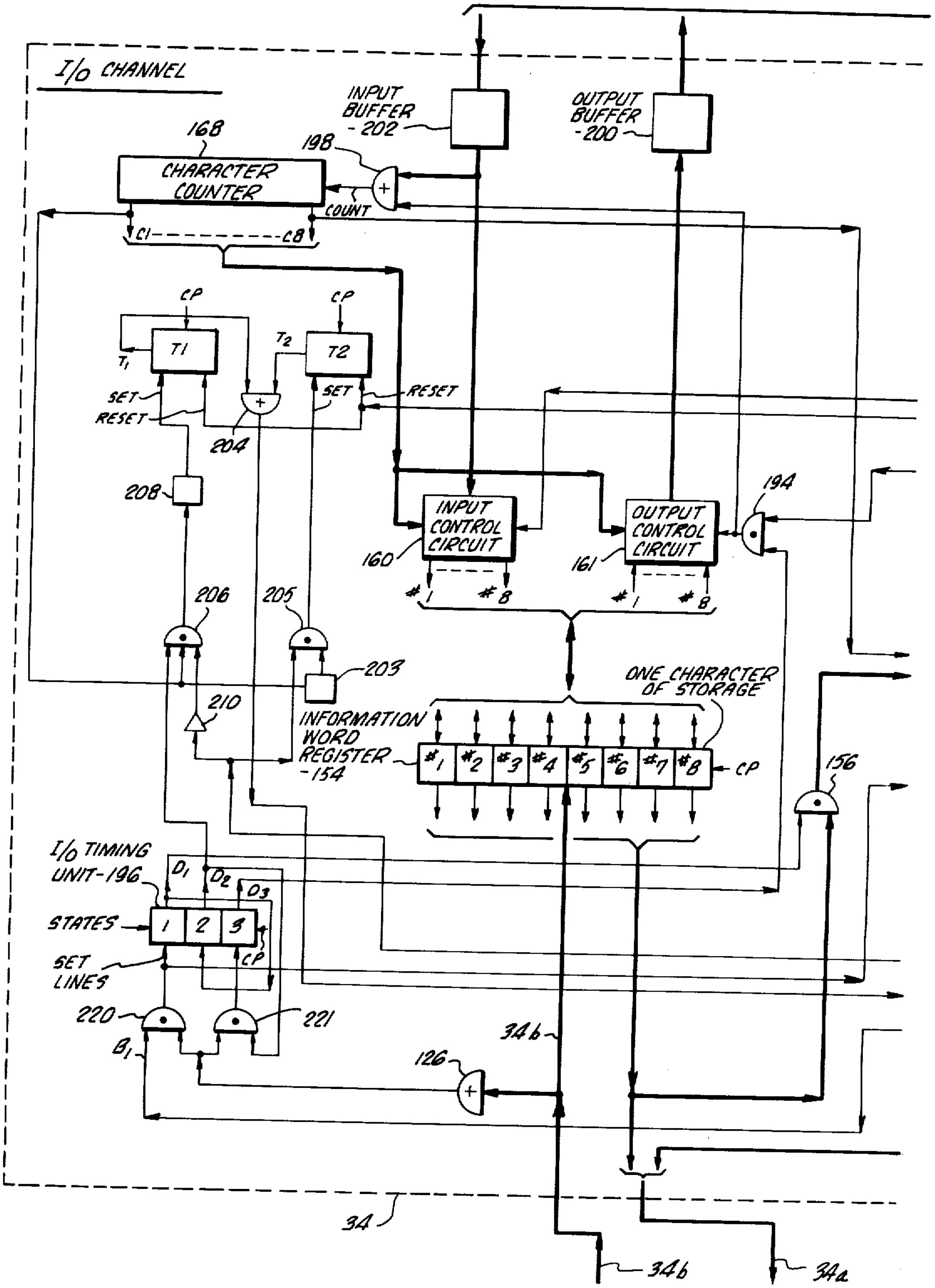
Figure 3E:
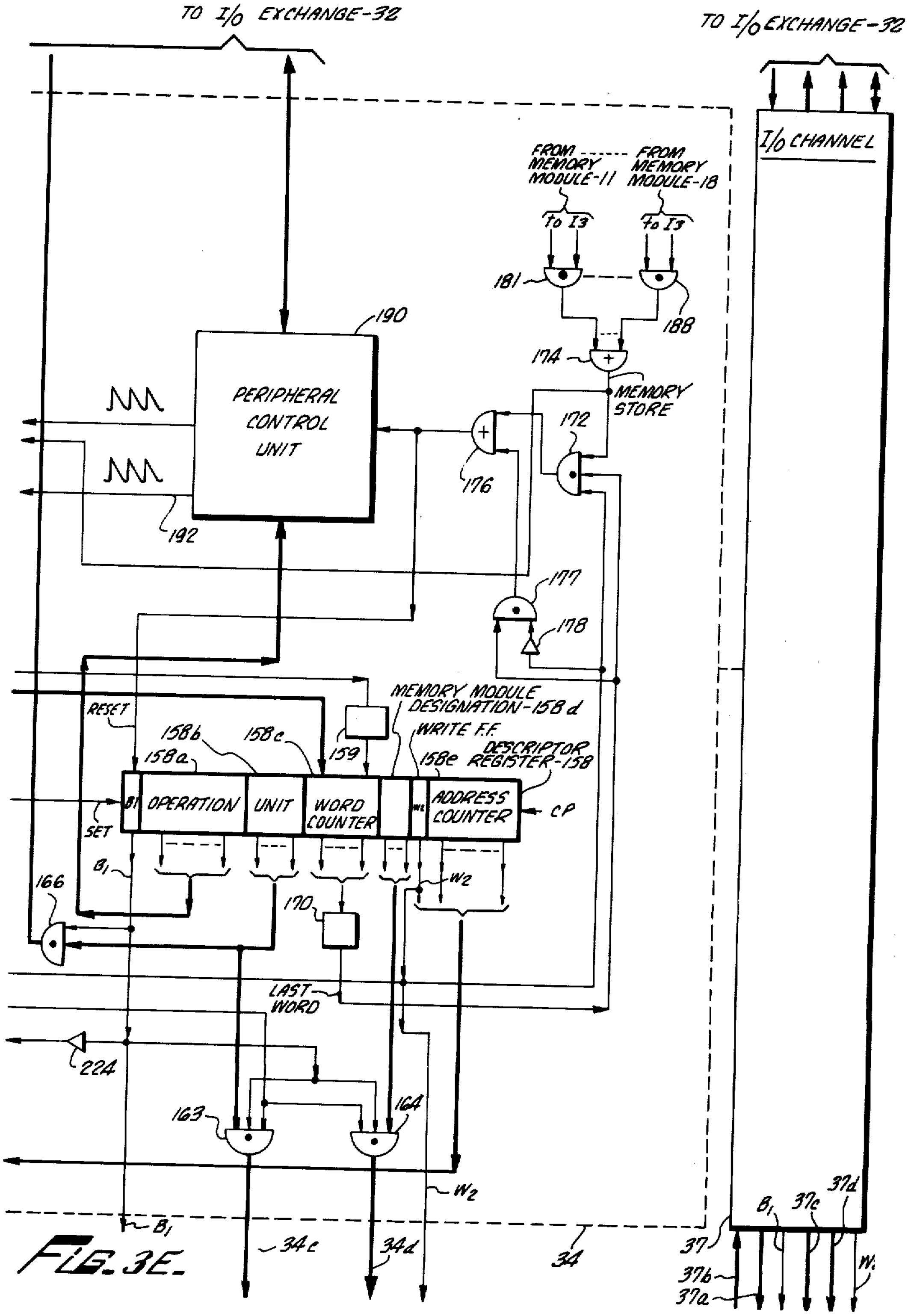

With the detail of switch interlock 38 in mind, a description will now be given of the circuits of the I/O channel 34 as shown in FIGS. 3D and 3E. The information input cable 34*b* of the I/O channel 34 is connected to the input circuit of an information word register 54. The information word register 54 has forty-eight storage elements, such as flip-flop circuits, for storing binary bits of information. The information word register 54 is divided up into eight sections, each of which is for storing one character of binary coded signals. Each character of binary coded signals is composed of six bits of information. Separate input circuits to each of the eight characters of storage of the information word register 54 are separately connected to eight separate input circuits of an input control circuit 160. Output circuits of each of the eight characters of storage of the information word register 154 are separately connected to eight input circuits of an output control circuit 161. All output circuits are joined in one cable and coupled through an "and" gating circuit 156 to the input circuit of a descriptor register 158.

The descriptor register 158 has a plurality of flip-flops for storing binary digital signals including a flip-flop B1 for indicating when I/O channel 34 is busy. The other flip-flops of the descriptor register 158 are divided into sections as follows: an operation section 158*a*, a unit designation section 158*b*, a word counter section 158*c*, a memory module designation section 158*d*, a write flip-flop W2, and an adddress counter section 158*e*. Referring to FIG. 2 which shows the word structure of a descriptor word, sections 158*a* through 158*e* and the write flip-flop W2 are arranged for storing a descriptor word. The descriptor register 158 has not been provided with storage for the five spare bits of a descriptor word as these five bits are not used by the I/O channel 34.

Means for requesting access to the memory modules

11 through 18 are provided including two "and" gating circuits 163 and 164. The "and" gating circuit 163 couples the output circuits of the units designation section 158*b* of the descriptor register 158 to the cable 34*c*. The "and" gating circuit 164 couples the output circuits of the memory module designation section 158*d* to the cable 34*d*. Timing signals are also applied to the "and" gating circuits 163 and 164 causing them to selectively connect and disconnect the outputs of the associated sections of the I/O descriptor register 158 to the cables 34*c* and 34*d*. The memory module designation section 158*d* stores the portion of the descriptor word specifying which of the memory modules 11 through 18 a request for access is being made to and the units designation section 158*b* is needed for indicating which of the peripheral units request for access is being made for so that the priority circuits 56 may properly assign priority.

The units designation section 158*b* is also coupled through an "and" gating circuit 166 to the I/O exchange 32. Another input circuit of the "and" gating circuit 166 is connected to the $B_1$ output circuit of the busy flip-flop B1. Whenever a new descriptor word has been shifted into the I/O channel 34 and the busy flip-flop B1 triggered into a true state, the "and" gating circuit 166 couples the output of the units designation section 158*b* to the I/O exchange 32 and causes a path to be set up between the peripheral unit designated thereby and the I/O channel 34. The word counter section 158*c* and the address counter 158*e* have an input circuit connected through a differentiating circuit 159 to a C8 output circuit of a character counter 168. Whenever a high potential signal is developed at the C8 output circuit of the character counter 168, the differentiating circuit 159 develops a pulse long enough for one clock pulse to occur. This causes the word counter 158*c* and the address counter 158*e* to count down one state. The output circuit of the word counter 158*c* is connected to the input circuit of a gating circuit 170. Initially when a new descriptor word is stored in the I/O descriptor register 158 the number of words to be transferred between the peripheral unit designated thereby and a memory module is stored in the word counter section 158*c*. The gating circuit 170 develops a high potential output signal whenever the word counter 158*c* is in state zero.

The output circuit of the gating circuit 170 is connected to the input circuit of an "and" gating circuit 172. The "and" gating circuit 172 has two other input circuits which are connected to the output circuit of an "or" gating 174 and the W2 output of the write flip-flop W2. The "or" gating circuit 174 has eight input circuits connected to the output circuits of "and" gating circuits 181 through 188. The "and" gating circuit 181 has two input circuits which are connected to the $t_0$ output circuit of the memory counter 62 and the priority line I3 in the memory module 11. The "and" gating circuits 182 through 188 are similar to the "and" gating circuit 181 except that they are connected to the corresponding output circuits of the memory modules 12 through 18 rather than the memory module 11. The "and" gating circuit 172 has a single output circuit connected to the input of an "or" gating circuit 176. The "or" gating circuit 176 has another input circuit connected to the output of an "and" gating circuit 177. The "and" gating circuit 177 has two input circuits, one of which is connected to the W2 output of the write flip-flop W2 and the other is coupled through a signal inverter 178 to the output of the last word gate 170.

To be explained in detail, the circuits including 181 through 188, 170, 172, 174, 176, 177, and 178 comprise a means for indicating when the memory store cycle taking place in a memory module is complete after the last word of information has been transferred from a peripheral unit to a memory module. The output circuit of the "or" gating circuit 176 is connected to the reset input circuit of the busy flip-flop B1. Whenever a high potential signal is developed by the "or" gating circuit 176, the busy flip-flop B1 is reset to a false state.

The character counter 168 has eight distinct states of operation and corresponding to the eight states of operation has eight output circuits designated by the symbols C1 through C8. The character counter 168 is not synchronized to clock pulses from the clock pulse generator 41 but has an input circuit for causing it to sequentially count from state one through state eight and then back to state one, connected to an "or" gating circuit 198. The character counter 168 counts up one state in response to each high potential signal from the "or" gate 198. During states one through eight, high potential output signals are developed on the correspondingly numbered output circuits. The "or" gating circuit 198 has two input circuits, one of which is connected to the output circuits of the input buffer register 202 and the other to the "and" gating circuit 194. Whenever the input buffer register 202 receives and stores a character of signals from a peripheral unit, the "or" gating circuit 198 receives a high potential signal on one of its input lines causing a count signal to be applied to the character counter 168. The "or" gating circuit 198 also develops a count signal whenever the "and" gating circuit 194 develops a high potential signal.

The operation section 158*a* of the descriptor register 158 is connected to an input circuit of a peripheral control unit 190. Whenever a new descriptor word is stored in the descriptor register 158 and the unit designation section 158*b* sets up a path in the I/O exchange 32 between the I/O channel 34 and the designated peripheral unit, the peripheral control unit 190 then starts controlling the operation of the peripheral unit to which the I/O channel is then connected. For example, if a tape unit is designated, the tape unit will then be automatically turned on and stopped under the control of the peripheral control unit 190. The peripheral control unit 190 also has an output circuit connected to an "and" gating circuit 194. The "and" gating circuit 194 has a timing input circuit connected to the D3 output circuit of an I/O timing unit 196. The output circuit of the "and" gating circuit 194 is connected to an input circuit of the output control circuit 161 and the input circuit of the "or" circuit 198.

Each of the peripheral units 26 through 31 has its own internal source of timing pulses or clock pulses. When a path is set up through the I/O exchange 32 to a peripheral unit, the peripheral control unit 190 is connected to the source of timing pulses of that unit. The peripheral control unit then couples these pulses to the gate 194. Whenever a pulse is provided to the "and" gating circuit 194 by the peripheral control unit 190 and the I/O timing unit 196 is in state 3 causing a high potential signal at the D3 output circuit, the "and" gating circuit 194 provides a signal to the output control circuit 161 causing it to read a character of signals from the information word register 154 and store it in an output buffer register 200. The character storage location from which the character of signals is read depends on the state of the character counter 168. If the character counter is in state one, the character of signals is read from character storage #1; if in state two, it is read from character storage #2; et cetera.

The input control circuit 160 is connected to the peripheral control unit 190 and also operates in response to timing pulses from the peripheral control unit 190. Each time a pulse is received from the peripheral unit 190, the input control circuit 166 couples the output circuit of the input buffer 202 to the character of storage which has a number corresponding to the state of operation of the character counter 168. Thus when a timing pulse is received from the peripheral control unit 190 by the input control circuit 160 and the character counter 168 is in state one, the output circuit of the input buffer 202 will be coupled to the input circuit of the character storage #1 of the information word register 54 causing the character of signals stored in the input buffer register 202 to be read and stored in the character storage #1 of the information word register 154.

The output circuits of the output buffer 200 and the input circuits of the input buffer 202 are connected to the I/O exchange 32. When the path is set up between the I/O channel 34 and a peripheral unit, the input and output circuits of the input buffer 202 and output buffer 200 are also connected to the peripheral unit. This allows the signals read from the peripheral unit to be stored in the input buffer 202 a character at a time and allows the characters of information stored in the output buffer 200 to be read and written into the peripheral unit, also a character at a time.

Also included in the means for requesting access, which included the "and" gating circuit 163 and 164, are timing flip-flops designated by the symbols T1 and T2 and associated trigger circuits. The input circuit of the timing flip-flop T2 for setting it to a true state is coupled to the output of an "and" gating circuit 205. The "and" gating circuit 205 has two input circuits, one of which is connected through a differentiating circuit 203 to the C1 output circuit of the character counter 168 and the other is connected to the $W_2$ output circuit of the write flip-flop W2. The $T_2$ output circuit of the timing flip-flop T2 is coupled trough the "or" gating circuit 204 to one of the input circuits of both the "and" gating circuits 163 and 164. The other input circuit of the "or" gating circuit 204 is connected to the $T_1$ output circuit of the timing flip-flop T1. The input circuit of the timing flip-flop T1 for setting it into a true state is coupled to the output circuit of the "and" gating circuit 206 through a differentiating circuit 208. The "and" gating circuit 206 has three input circuits, one of which is connected to the output circuit of a signal inverter circuit 210, the other two input circuits of the "and" gating circuit 206 are connected to the output circuit C1 of the character counter 168 and the D2 output circuit of the I/O timing unit 196. The inverter circuit 210 has an input circuit which is also connected to the $W_2$ output circuit of the write flip-flop W2. The reset input circuits of both the timing flip-flops T1 and T2 are connected to the output circuit of the "or" gating circuit 174. Whenever the character counter steps into state one, the differentiating circuit 203 applies a high potential signal to the input of the "and" gating circuit 205 just long enough to allow one clock pulse to occur. This allows the flip-flop T2 to be triggered to a true state only once while the character couter 168 is in state one. The differentiating circuit 208 has a similar function for the flip-flop T1.

The timing flip-flop T2 will be triggered into a true state causing a high potential signal to be provided to the "and" gating circuits 163 and 164 whenever the character counter 168 steps into state one and the write flip-flop W2 is in a true state, indicating that information is to be read from tape and written into one of the memory modules 11 through 18. The timing flip-flop T2 will then be reset to a false state whenever a memory cycle has been started in the memory module into which information from the I/O channel 34 is to be stored indicated by a high potential output signal from the "or" gating circuit 174.

Similarly, the timing flip-flop T1 will be set to a true state whenever the write flip-flop W2 is in a false state, indicating that information is to be read out of a memory module and written into one of the peripheral units, the character counter 168 is in state one, and the I/O timing unit 196 is in state one. This again causes a high potential signal to be delivered by the "or" gating circuit 204 to the input circuit of the "and" gating circuits 163 and 164. The timing flip-flop T1 will then be reset to a false state when the memory cycle has been initiated, indicated by a high potential signal out of the "or" gate 174.

Referring to the "and" gating circuits 163 and 164, a third input circuit thereof is connected to the output circuit $B_1$ of the busy flip-flop B1. Thus it is now evident that the "and" gating circuits 163 and 164 will cause the units section **158*b* and the memory module designation section 158*d* to be coupled to the input circuits of the memory modules and thereby request access to one of the memory modules whenever the busy flip-flop B1 is true and either of the timing flip-flops T1 and T2** are in a true state.

The I/O timing unit 196 has three flip-flops and three possible states of operation. Corresponding to the states of operation are three output circuits designated by the symbols D1, D2, and D3. The I/O timing unit 196 has three input circuits for controlling its possible states of operation. The input circuit for setting it into state one in coupled to the output circuit of an "and" gating circuit 220. The input circuit for setting the I/O timing unit 196 into state two is connected to the D1 output circuit and the input circuit for setting it into state three is connected to the output circuit of an "and" gating circuit 221. The "and" gating circuit 220 has two input circuits, one of the input circuits is connected through an inverter circuit 22 to the output circuit $B_1$ of the busy flip-flop B1 and the other input circuit is connected to the output circuit of an "or" gating circuit 126. The input circuits of the "and" gating circuit 221 are connected to the output circuit D2 of the I/O timing unit 196 and the output circuit of the "or" gating circuit 126. The "or" gating circuit 126 has its input circuits connected to the lines in the input cable **34*b***.

Thus, whenever input signals are connected to the information word register 154 by the switch interlock circuit 38, the "or" gating circuit 126 provides a high potential signal to the "and" gating circuits 220 and 221. If the busy flip-flop B1 is false, indicating that I/O channel 34 is not busy, the "and" gating circuit 220 will cause the I/O timing unit 196 to be set into state one.

The output circuit of the "and" gating circuit 220 is also connected to the set input circuit of the busy flip-flop B1. Therefore, a signal from the "and" gating circuit 220 will trigger the I/O timing unit 196 into state one and will trigger the busy flip-flop B1 into a true state, thereby indicating the I/O channel 34 is busy.

The output circuit D1 of the I/O timing unit 196 is also connected to another input circuit of the "and" gating circuit 156, which couples the output circuit of the information word register 154 to the input circuit of the I/O descriptor register 158. To be explained whenever the timing unit 196 is set into state one, a descriptor word is stored in the information word register 154 and the output circuit of the information word register 154 is coupled to the input circuit of the descriptor register 158, causing the descriptor word to be read from the information word register 154 and stored in the descriptor register 158.

With the detailed description of the circuits of the data processing system shown in FIGS. 3A through 3E in mind, an example will now be given describing the sequence of operation of the data processing system.

First of all, assume that a step has been reached in the program where new signals are to be read out of a memory module and stored in the processor 20. The processing circuits 42 will store memory designation signals, under program control, in the memory module designation section **46*b* of the M register 46. Also, the address within the magnetic core memory unit 68 of the designated memory module from which the signals are to be read out will be stored in the memory address section 46*a*. The processing circuits 42, under program control, will then store order operator signals in the flip-flop circuits P3 through P48 of the P register 48. Also, the write flip-flop P2 will be triggered to a false state, indicating that signals are to be read out of a memory module and stored in the processor 20 and the descriptor flip-flop P1 will be triggered to a false state indicating that the word read out of the designated memory module is not a descriptor word for storage in one of the I/O channels 34 through 37 but is to be stored in processor 20. The order operator signals stored in the order section 48*a* specify that a request for access must be made to a memory module and cause the gating circuit 54 to apply a trigger signal to the memory access flip-flop A1, triggering it to a true state. The "and" gating circuit 50 couples the outputs of the memory module designation section 46*b*, which is now storing signals designating the memory module to be addressed, to the output cable 20*d*. Assume that the memory designation signals specify access is requested to memory module 11. The priority circuit 56 detects that a request for access is being made to the memory module 11 and when priority is given to the processor 20, the memory counter 62 is triggered from state five into state zero and signals indicative of the processor 20 are stored in the assignment register 60, causing a priority signal on the priority line I1. The signal on the priority line I1 causes the "and" gating circuit 111 in the switch module 81 to couple the output cable 20*a* of the processor 20 to the input circuit of the "and" gating circuit 76. During state zero of the memory counter 62, the "and" gating circuit 76 couples the output circuits of the "and" gating circuit 111 to the input information cable 11*b* and the memory address stored in the memory address section 46*a* is stored in the memory address register 70 of memory module 11. At the same time, the write flip-flop W1 is triggered into a false state corresponding to the false state of the write flip-flop P2. During states one and two of the memory counter 62, the magnetic core memory unit 68 goes through a read cycle during which the signals in the memory location addressed by the memory address register 70 are read out and stored in the memory information register 72. During state three of the memory counter 62, the "and" gating circuits 74 couple the output circuit of the memory information register 72 to the information output cable 11*a*. Since a priority signal is still being developed on the priority line I1 and the descriptor flip-flop P1 is in a false state, the "and" gating circuit 141 of the switch module 100 couples the information output cable 11*a* of the memory module 11 to the input cable 20*b* to the processing circuits 42 of the processor 20 and the word of information read out of the magnetic memory core unit 68 is then stored and subsequently used in the operation of the processor 20**.

Assume now that the write flip-flop P2 is in a true state rather than a false state indicating that signals stored in the register 44 of the processor 20 are to be read out and written into the magnetic core memory unit 68 of memory module 11. The operation of the data processing system is the same as that described above up until the point where memory counter 62 is in state zero. Assume the memory counter 62 is in state zero. The switch module 81 couples the output cable **20*a* of the processor 20 to the information input cable 11*b* of the memory module 11, however, this time the forty-eight signal bits of information stored in the register 44 are stored in the memory information register 72. At the same time, the write flip-flop W1 will be triggered true corresponding to the true state of the write flip-flop P2. During the subsequent states one and two of the memory counter 62, the magnetic core memory unit 68 goes through a write cycle during which the signals in the memory information register 72 are written into the memory location of the magnetic core memory unit 68 addressed by the memory address stored in the memory address register 70**.

During state four of the memory counter 62, after either a read or write cycle of the magnetic memory core unit 68, the assignment register 60 is cleared and the priority signal out of the decoding circuit 66 is removed. This causes the memory module 11 to become available for receiving requests from other units of the data processing system.

With the first example in mind, a second example will now be given illustrating the sequence of operation of the data processing system when signals are transferred between one of the peripheral units 26 through 31 and a memory module. The processor 20 is the only unit in the system which can initiate an input-output operation during which signals are transferred between a peripheral unit and a memory module. An input-output operation is initiated by processor 20 by setting the descriptor flip-flop P1 into a true state, setting the write flip-flop P2 into a false state, storing an order operator signal in the order section 48*a* of the P register 48, storing the address of a descriptor word in the memory address section 46*a* and storing memory designation signals in the memory designation section 46*b*. The subsequent operation of the data processing system in requesting access to a memory module is identical to that described in the first example up to the point where signals are read out of the magnetic core memory unit 68 and stored in the memory information register 72.

Assume now that the descriptor word has been read out of the magnetic core memory unit 68 and stored in the memory information register 72. It should be noted at this point that the assignment register 60 is still storing signals assigning priority for the processor 20 to memory module 11. During state three of the memory counter 62 and "and" gating circuit 74 gates out the decriptor word stored in the memory information register 72 to the output information cable 11*a*.

Assume at this point that the I/O channel seeking circuit 40 (see FIG. 1) indicates that the I/O channel 34 is not busy. Since the descriptor flip-flop P1 is now in a true state, the I/O channel seeking circuit 40 is developing a high potential signal on the line S1 and a priority signal is being developed on the priority line I1, the "and" gating circuit 132 gates the output cable 11*a* to the input cable 34*b* to the information word register 154 of the I/O channel 34. The busy flip-flop B1 is initially false, indicating that the I/O channel 34 is not busy, therefore, the high potential signal out of the "or" gating circuit 126, when the signals were gated into the input of the information word register 154, triggers the I/O timing unit 196 into state one. The same signal provides a set signal to the busy flip-flop B1 triggering it into a true state.

With the I/O timing unit 196 in state one, the descriptor word stored in the information word register 154 is then gated out through the "and" gating circuit 156 and stored in the descriptor register 158.

At this point, consider what is happening in the memory module 11 which has given priority to the processor 20 and from which the descriptor word has been read out and stored in the I/O channel 34. The memory counter 62 stepped from state three into state four during which the assignment register 60 was cleared. This again releases the memory module 11 allowing it to receive new requests for access from the processor 20, the processor 22, and any of the I/O channels 35 and 37.

At this point, two different sequences of operation may be taken by the digital data processing system depending on the type of operation specified by the descriptor word stored in the descriptor word register 158 and the state of the write flip-flop W2.

First of all, assume that signals are to be read from a peripheral unit and written into the magnetic core memory unit of one of the memory modules 11 through 18, as opposed to reading signals from a memory module and storing them in a peripheral unit. The write flip-flop W2 is now in a true state. Initially, the character counter 168 is in state one, due to the result of a previous sequence of operation, causing a high potential output signal at the output circuit C1. Also, the timing flip-flops T1 and T2 are in a false state.

The units designation portion of the descriptor word stored in the section 158*d* of the descriptor register 158 is now gated out to the input of the I/O exchange 32 by the "and" gating circuit 166. This sets up a path between the I/O channel 34 and the designated peripheral unit. Assume that the magnetic tape unit 26 is specified as the peripheral unit from which to receive input signals. The operation specified by the operation portion of the descriptor word in the section 158*a* causes the peripheral control unit 190 to turn on the tape unit 26 and start a reading process from magnetic tape in a manner well known in the magnetic tape art.

When the first character of information is read from the magnetic tape unit 26, it is stored in the input buffer 202. This causes the "or" gating circuit 198 to count the character counter 168 up one state into state two. However, before the character counter 168 actually changes state, the peripheral control unit 190 supplies a pulse to the input control circuit 160 causing the characters stored in the input buffer 202 to be coupled to the input circuit of the character storage section #1 of the information word register 154, where the first character is stored. This operation of reading a character of signals from tape, storing the character of signals in the information word register 154, and counting the character counter 168 up one continues until a word of signals is stored in the information word register 154. During the operation the character counter 168 has counted from state one through state eight and back to state one.

Before the character counter 168 has stepped out of state eight to step one, the I/O channel 34 waiting for the last character of data signals from the magnetic tape unit 26 to complete a word of information stored in the information word register 154. The high potential at the output circuit C8 of the character counter 168 during state eight causes the word counter section 158*c* to be counted down one state, and the address counter section 158*e* to be counted up one state. The character counter 168 subsequently steps into state one when the last character of a word is read from tape and stored in the information word register 154, causing the "and" gating circuit 205 to receive a pulse signal from the differentiating circuit 203. Since the write flip-flop W2 is in a true state, the timing flip-flop T2 is now triggered into a true state. The busy flip-flop B1 is also true and the "and" gating circuits 163 and 164 now couple the output circuits of the units section 158*b* and the memory module designation section 158*d* to the cables 34*c* and 34*d* causing a request for access to be presented to one of the memory modules. Assume that the memory module designation portion of the descriptor word stored in section 158*d* of the descriptor register 158 specifies memory module 11. When the priority circuit 56 of the memory module 11 assigns priority to the I/O channel 34 and the signals designating the I/O channel 34 are stored in the assignment register 60, the memory counter 62 of the memory module 11 is triggered from state five into state zero and a priority signal is developed on the priority line 13. This causes the switch module 81 to couple the output cable 34 from the I/O channel 34 to the information input cable 11*b* of the memory module 11. The word of information in the information word register 154 is then stored in the memory information register 72, the write flip-flop W1 is triggered into a true state corresponding to the true state of the write flip-flop W2, and the counted up memory address stored in the memory address counter 158*e* is stored in the memory address register 70. While the assignment register 60 is still assigning priority to the I/O channel 34 and a signal is being developed on the priority line 13, state zero of the memory counter 62 causes a signal to be developed by the "or" gate 174 and applied to the reset input circuit of the timing flip-flop T2. This resets the timing flip-flop T2 to a false state causing the request for access through the "and" gating circuits 163 and 164 to cease. The memory counter 62 then sequences through state one through state five and then the memory module 11 is again released for accepting requests for access from the I/O channels and the processing units.

Following this operation, the information word rigister 154 is again filled character by character from the magnetic tape unit 26 as described above, the memory address section **158*e* counted up one state and the word counter 158*c* counted down one state, and the word of information stored in the information word register 154 transferred to memory module 11 and stored. This time the word of information will be stored in a different memory location since the address was counted up one in the address counter section 158*e*. The operation is repeated until the word counter 158*c* is counted down to state zero. When the word counter 158*c* is in state zero, it causes a signal to be developed by the gating circuit 170 and applied to the "and" gating circuit 172. The write flip-flop W2 is in a true state and when the memory cycle in memory module 11 is initiated, indicated by the zero state of the memory counter 62, the "and" gating circuit 172 (through the "or" gating circuit 176) signals the peripheral control unit 190 to cease the operation of the tape unit 26 and the busy flip-flop B1 is reset to a false state indicating that I/O channel 34 is no longer busy and can be used for other communications between the memory modules 11 through 18 and the peripheral unit 26 through 31**.

Assume the other sequence of operation is to be taken and that when the descriptor word was stored in the descriptor word register 158 and the I/O timing unit 196 was triggered into state two, the descriptor word triggered the write flip-flop W2 into a false condition indicating that signals were to be read out of one of the memory modules 11 through 18 and subsequently stored in one of the peripheral units 26 through 31. With the write flip-flop W2 in a false state, the I/O timing unit 196 in state two, and the character counter 168 in state one, the differentiating circuit 208 causes a set signal to be provided to the timing flip-flop T1. The timing flip-flop T1 is triggered into a true state causing the "and" gating circuits 163 and 164 to again present a request for access to the memory modules. Assume again that the memory module designation section **158*d* contains signals specifying that access is to be made to memory module 11. Access is again requested to memory module 11 and at the same moment the peripheral control unit 190 starts the magnetic tape unit 26 in motion and provides signals to it indicating the characters of information are to be written on magnetic tape. When access to memory module 11 is again obtained by the I/O channel 34, the cable 34*a* is coupled to the input information cable 11*b* by the switch module 81 causing the signals stored in the memory address section 158*e* and the state of the write flip-flop W2 to be stored in memory address register 70 and the write flip-flop W1 respectively. Since the write flip-flop W1 is false, in the same state as the write flip-flop W2, it specifies that a read cycle is now to take place. During states one and two of the memory counter 62, the magnetic core memory unit 68 reads out the word stored in the addressed memory location and stores the word in the memory information register 72. During state three of the memory counter 62, the word of information stored in the memory information register 72 is gated out through the switch module 94** into the information word register.

As the word of information is stored in the information word register 154, it causes a high potential signal out of the "or" gate 126 causing the I/O timing unit 196 to be triggered from state two to state three. By this time the peripheral control unit 190 has started to supply timing signals to the "and" gate 194. The high potential signal at the output circuit B3 of the I/O timing unit 196 causes the "and" gating circuit 194 to apply the timing signals from the peripheral control unit 190 to both the output control circuit 161 and the character counter 168. Since the character counter 168 is initially in state one, the output control circuit 161 couples the first character of signals stored in the character storage #1 of the information word register 154 to the output buffer 200. The pulse that causes the signals to be stored in the output buffer 200 also triggers the character counter 168 into state two. The next timing signal from the peripheral control unit 190 causes the characters stored in the character storage #2 of the information word register 154 to be gated out into the output buffer 200 and the character counter 168 is triggered into state three. This operation continues, a character being transferred from the information word register 154 at a time, and stored on the magnetic tape of the magnetic tape unit 26 until the character counter 168 is in state eight.

When the character counter 168 steps into state eight, it causes the word counter **158*c* to be counted down one state and the memory address counter 158*e* to be counted up one state. After the character stored in the character storage location #8 of the information word register 154 is read out and stored in the output buffer 200, the character counter 168 is counted into state one, causing a request for access to memory module 11. When priority is again assigned to the I/O channel 34, and the counted up address in the address counter 158*e* stored in the memory address register 70, the next word is read out of the magnetic core memory unit 68 and subsquently stored in the information word register 154 and the above sequence of operation for transferring the eight characters of the word of information to the magnetic tape unit 26** is repeated.

When the last word of information to be transferred has been read out from the information word register 154 and stored on the tape of the magnetic tape unit 26, state eight of the character counter 168 causes the word counter **158*c* to count to state zero. This causes a state zero signal out of the gating circuit 170 to the "and" gating circuit 177. Since the write flip-flop W2 is in a false state, the "and" gating circuit 177 causes a signal to be applied through the "or" gating circuit 176 to the peripheral control unit 190 signaling it that the last word of information to be transferred from memory module has been stored in the information word register 154 and that when the next character is read from the information word register 154 and stored on magnetic tape of the magnetic tape unit 26 that the operation of the magnetic tape unit 26 is to terminate. This also triggers the busy flip-flop B1 into a false condition indicating that I/O channel 34 is no longer busy. At this point, I/O channel 34** is again released for other communication between the memory modules and peripheral units.

It should be understood that a word of signals may be transferred from a memory module to one of the I/O channels and that intermixed in between the transfers of words of signals between a particular memory module and an I/O channel, transfers of a word of signals may be made between another I/O channel and the same memory module. The transfer of a word of signals may also be intermixed in between the transfer of a word of signals between the same memory module and one or both of the processing units. Thus it may be seen that more than one of the units in the system may be transferring a word of signals to a memory module at the same time. This is particularly useful with the arrangement of peripheral units 26 through 31 since the speed of each is different, thus allowing the intermixing of transfers of the signals depending on their speed of operation with a minimum amount of conflict. Such an arrangement of the elements of this data processing system allows maximum use to be made of the I/O channels and the memory modules and greatly reduces any inefficiencies due to component idleness previously an inherent part of data processing systems. It should also be evident that any I/O channels may also be associated with any peripheral unit due to the connecting ability of the I/O exchange 32. Also, I/O channels may be eliminated or added as the work load changes without any change or effect on the program for operating the data processing system. Such an arrangement of components also frees the Master Control Program, for operating the data processing system, from the burden of the sequencing and controlling each step of the operation of the input-output system and allows it to perform more important tasks. It should also be noted that the processor 20 merely needs to initiate an input-output operation, then it may return to other functions as required by the system.

What is claimed is:

1. In a computing system including at least one memory module for storing digital signals for processing and program signals for controlling the processing thereof, at least one digital data processor for processing the digital signals under the control of said program signals and a switch interlock means connected to said memory module and said digital data processor for controlling the transfer of signals to and from said memory module, the improvement comprising the combination of a plurality of input-output channel means coupled to said switch interlock means for transferring signals to and from said memory module, each of said input-output channel means including output circuit means for indicating whether the channel means is in use, seeking circuit means coupled to each of said output circuit means for determining whether the corresponding channel means is in use and coupled to said switch interlock means for providing a corresponding indication thereto and thereby cause said switch interlock means to selectively couple a channel means which is not in use to said memory module, a plurality of input-output units including at least a rotatable magnetic storage drum, a punched card reader, a card punch, a keyboard, and a message printer, said channel means including an input-output control circuit within each channel means adapted for operatively controlling any one of said input-output units from the corresponding channel means, and input-output exchange means connected for coupling any one of said channel means including said input-output control circuit thereof to any one of said input-output units to enable the control of any input-out unit from any channel means and thereby cause the transfer of signals therebetween.

2. A computing system comprising switching circuit means including a plurality of input and output circuits and being adapted to control the transfer of information between said input and output circuits, memory means coupled to input and output circuits of said switching circuit means, a plurality of input-output units, a plurality of input-output channel means including an input-output control circuit within each channel means adapted for operatively controlling any one of said input-output units from the corresponding channel means, each channel means being coupled to input and output circuits of said switching circuit means and including means for selectively causing the transfer of information between said memory means and any one of said input-output units and output circuit means for indicating when the corresponding channel means is not in use, exchange switching means adapted for individually coupling any one of said channel means, including said input-output control circuits, to any one of said input-output units to thereby enable the control of any input-output unit and cause the transfer of information therewith by any channel means, and seeking circuit means connected to said switching circuit means and coupled to be individually responsive to each of said output circuit means of said channel means for providing a signal causing said switching circuit means to couple an unused channel means to said memory means.

3. A computing system comprising switching circuit means including a plurality of input and output circuits and being adapted to control the transfer of information between said input and output circuits, a plurality of memory means coupled to said input and output circuits of said switching circuit means, a plurality of input-output units, a plurality of input-output channel means including an input-output control circuit within each channel means adapted for operatively controlling any one of said input-output units from the corresponding channel means, each channel means being coupled to input and output circuits of said switching circuit means and including means for selectively causing the transfer of information between any one of said memory means and any one of said input-output units and output circuit means for indicating when the corresponding channel means is not in use, exchange switching means adapted for individually coupling any one of said channel means, including said input-output control circuits, to any one of said input-output units to thereby enable the control of any input-output unit and cause the transfer of information therewith by any channel means, and seeking circuit means connected to said switching circuit means and adapted to be responsive to said output circuit means of said channel means for providing a signal causing said switching circuit means to couple an unused channel means to one of said memory means.

4. A computing system comprising switching circuit means including a plurality of input and output circuits and being adapted to control the transfer of information between said input and output circuits, a plurality of memory means coupled to input and output circuits of said switching circuit means, a plurality of input-output units, a plurality of input-output channel means including an input-output control circuit within each channel means adapted for operatively controlling any one of said input-output units from the corresponding channel means, each channel means being coupled to input and output circuits of said switching circuit means and including means for selectively causing the transfer of information between any one of said memory means and any one of said input-output units and output circuit means for indicating when the corresponding channel means is not in use, exchange switching means adapted for individually coupling any one of said channel means, including said input-output control circuits, to any one of said input-output units to thereby enable the control of any input-output unit and cause the transfer of information therewith by any channel means, said switching circuit means additionally comprising a coupling circuit for each memory means coupled to each of said channel means, said coupling circuits being adapted for coupling a plurality of channel means to a plurality of memory means simultaneously for thereby allowing the simultaneous transfer of information therebetween, and seeking circuit means coupled to said coupling circuit means and coupled to be individually responsive to each of said output circuit means of said channel means for providing a signal causing a coupling circuit means to couple an unused channel means to a memory means.

References Cited by the Examiner

UNITED STATES PATENTS

| | | | |
|---|---|---|---|
| 2,902,675 | 9/59 | Shaw | 340—172.5 |
| 2,959,351 | 11/60 | Hamilton | 340—172.5 |
| 3,026,037 | 3/62 | Foin | 340—173 |
| 3,061,192 | 10/62 | Terzian | 340—172.5 |
| 3,063,036 | 11/62 | Reach et al. | 340—172.5 |
| 3,079,082 | 2/63 | Scholten et al. | 340—172.5 |

OTHER REFERENCES

IBM Reference Manual, RAMAC 305, 1958, pages 68 through 81, 157 through 162 and 203 through 212 relied upon.

MALCOLM A. MORRISON, *Primary Examiner.*

STEPHEN W. CAPELLI, IRVING L. SRAGOW, ROBERT C. BAILEY, *Examiners.*

UNITED STATES PATENT OFFICE
CERTIFICATE OF CORRECTION

Patent No. 3,200,380 August 10, 1965

Duncan N. MacDonald et al.

It is hereby certified that error appears in the above numbered patent requiring correction and that the said Letters Patent should read as corrected below.

Column 8, line 44, for "stred" read -- stored --; column 9, line 42, for "coble" read -- cables --; column 10, line 31, for "circuit 12." read -- circuit 121. --; line 75, for "modules 111" read -- modules 11 --; column 17, line 30, for "62 and" read -- 62 the --; column 18, line 30, after "channel 34" insert -- is --; column 19, line 65, after "register" insert -- 154 --.

Signed and sealed this 22nd day of February 1966.

(SEAL)
Attest:

ERNEST W. SWIDER
Attesting Officer

EDWARD J. BRENNER
Commissioner of Patents